Aug. 16, 1932. R. L. TEMPLIN 1,872,047
TESTING MACHINE
Filed Sept. 13, 1930 3 Sheets-Sheet 1
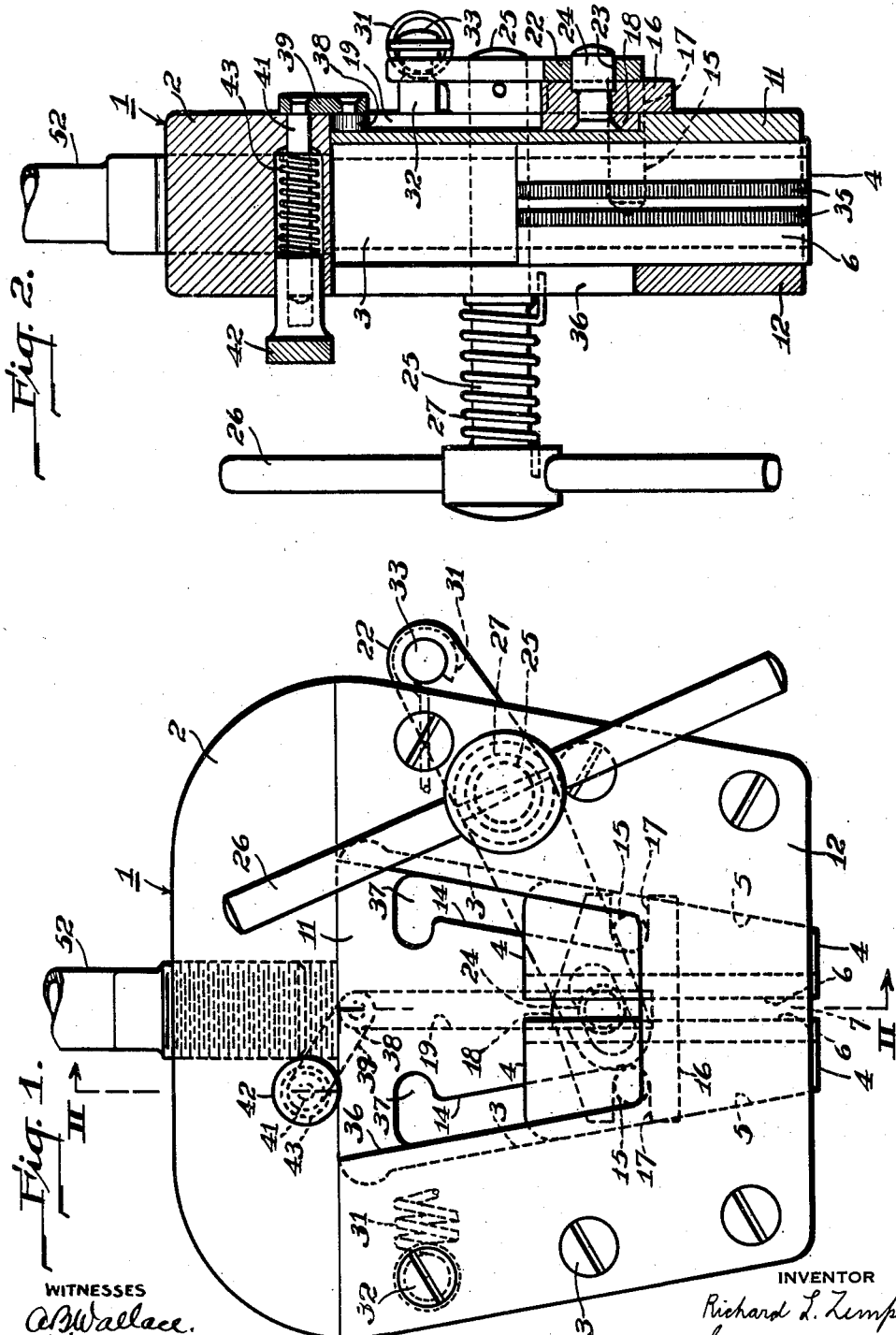

Aug. 16, 1932.    R. L. TEMPLIN    1,872,047
TESTING MACHINE
Filed Sept. 13, 1930    3 Sheets-Sheet 2

Fig. 3.

Fig. 4.

WITNESSES
A B Wallace
W. D. O'Connor

INVENTOR
Richard L. Templin
by Bround Critchlow
his attorneys

Aug. 16, 1932.  R. L. TEMPLIN  1,872,047
TESTING MACHINE
Filed Sept. 13, 1930  3 Sheets-Sheet 3
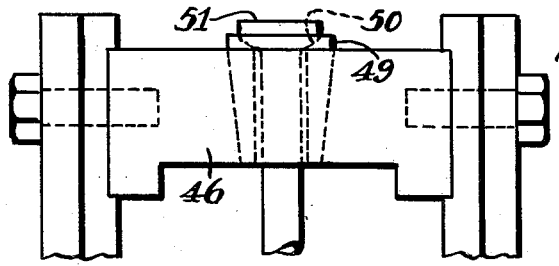
Fig. 7.
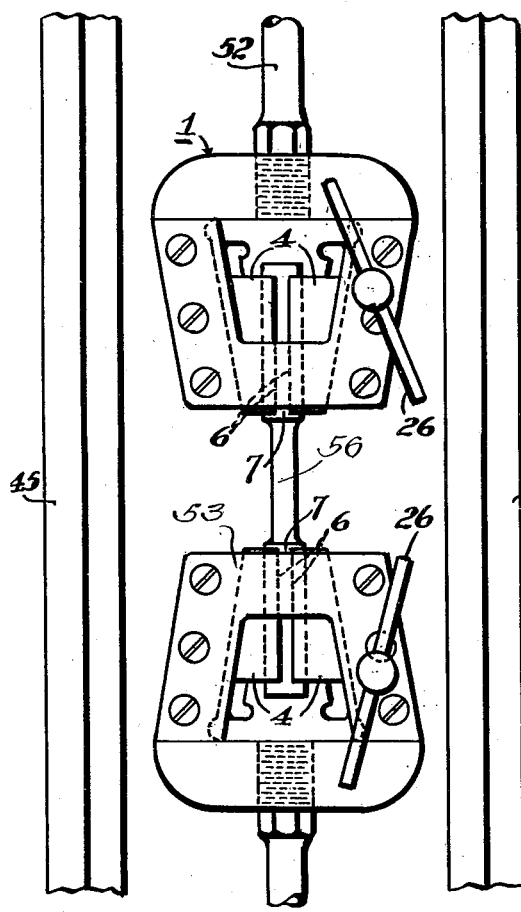
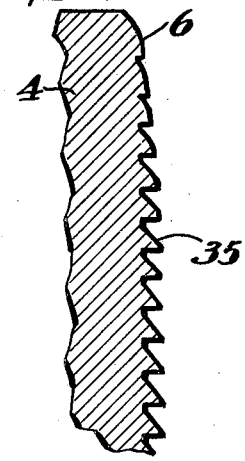
Fig. 6.
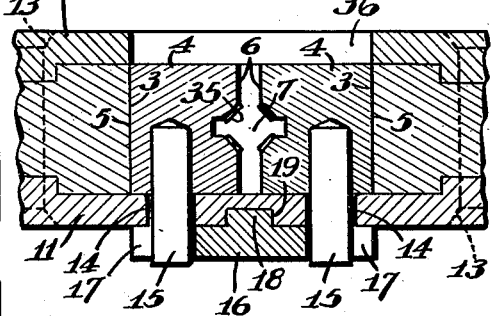
Fig. 5.
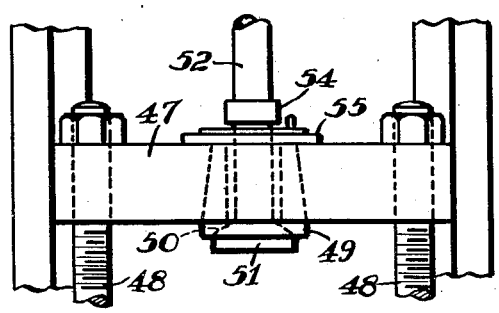
INVENTOR
Richard L. Templin
by
Brown & Critchlow
his attorneys Patented Aug. 16, 1932

1,872,047

UNITED STATES PATENT OFFICE

RICHARD L. TEMPLIN, OF PARNASSUS, PENNSYLVANIA, ASSIGNOR TO ALUMINUM COMPANY OF AMERICA, OF PITTSBURGH, PENNSYLVANIA, A CORPORATION OF PENNSYLVANIA

TESTING MACHINE

Application filed September 13, 1930. Serial No. 481,612.

This invention relates generally to testing machines, and particularly to shackles or grips for holding specimens of material to be tested.

A machine of the type commonly used for testing materials comprises two tables, one fixed and the other movable towards or away from the fixed table by means of screw and nut mechanism or a suitable fluid pressure device. A specimen of the material to be tested is connected between the fixed and movable tables in such manner that compression or tension forces may be applied to it as may be desired, and suitable means, such as a scale beam, are provided for measuring the amount of force exerted upon the specimen.

Ordinarily both the fixed table and the movable table are provided with centrally disposed wedge-shaped openings for receiving the ends of the specimen. Suitable wedge-shaped grips are provided for insertion in the wedge-shaped openings at the sides of the specimen in such manner that when force is applied the grips are drawn into the openings in the table and forced tightly against the specimen for holding it. In some testing machines the wedge-shaped openings are formed in separate blocks which may be spherically seated in the tables to permit the specimen to align itself with the forces exerted upon it. Ordinarily a number of wedges of different sizes are required, and, for holding some specimens, additional gripping members or shims are inserted with the wedges.

Gripping devices of this nature are inconvenient to handle because of the fact that various loose parts must be placed in position individually, and it is some times necessary to hold them by hand until force is applied by the machine to draw them into position. Further, with gripping wedges of this type it is difficult to so position them in setting up the testing machine as to ensure an even hold on the specimen and avoid setting up stresses other than those desired for the test. Also, after a specimen has been broken, difficulty may be experienced in removing the broken parts from the machine in the event that the wedges become jammed in the openings of the tables.

It is an object of my invention to provide a gripping device or shackle for holding a specimen in a testing machine, which device may be easily and quickly operated to grip or release the specimen.

A more specific object is to provide a testing machine shackle having gripping jaws which are pressed by means of a spring to the closed position, and having means for holding the jaws in open position for inserting or removing specimens.

Another object is to provide a testing machine shackle having gripping jaws which are normally held within and constitute a part of the shackle, but which may be readily removed therefrom.

A further object of the invention is to provide shackles for a testing machine which are provided with continuous longitudinal openings to permit the insertion of long specimens, such as wires.

The foregoing and other objects of the invention will appear upon reading the following detailed description of the apparatus for practicing the invention shown in the accompanying drawings, in which Fig. 1 is a view in front elevation of a shackle for a testing machine; Fig. 2 is a view in longitudinal section of the shackle taken on the planes represented by the broken line II—II, Fig. 1; Fig. 3 is a view in rear elevation of the shackle shown in Fig. 1; Fig. 4 is an end view looking upward at the shackle as shown in Fig. 3; Fig. 5 is a view in cross section of a fragment of the shackle taken on the plane indicated by the line V—V of Fig. 3; Fig. 6 is an enlarged view in section of a fragment of a gripping jaw showing the manner in which gripping teeth are formed on it; and Fig. 7 is a view in elevation of a portion of a testing machine showing two shackles in operating position and gripping a test specimen.

According to this invention clamping shackles for testing machines are each constructed as a unitary device having gripping jaw members that are forced towards the closed position by a spring. A suitable operating lever is provided for moving the jaw members to the open position, and convenient means provided for holding the jaw members open to permit specimens to be readily inserted. The particular embodiment of the invention shown in the drawings is a shackle for a testing machine designated generally by the numeral 1, and which comprises a jaw holder frame or yoke 2 having the general shape of a horse shoe.

As shown in Fig. 1 the inner surfaces 3 of the yoke 2 constitute plane guiding surfaces disposed obliquely in such manner that they converge towards the mouth of the yoke. The internal sloping faces 3 act as seats or guides for sliding wedge-shaped jaw members or wedge pieces 4 having external faces 5 that are complementary to the internal faces 3 of the yoke 2. The internal or adjacent faces 6 of the wedge pieces 4 are disposed in parallel relation, and constitute the jaws or gripping surfaces of the shackle. The surfaces 6 define a longitudinally disposed specimen-receiving or gripping opening 7 clearly seen in Figs. 4 and 5. It will be readily understood that when the wedge pieces 4 are moved downwardly along the converging guide surfaces 3, as shown in Fig. 1, the inner parallel faces 6 will approach each other and reduce the specimen-receiving opening 7 in such manner that a specimen disposed therein is tightly gripped. Further, the gripping force is augmented if force is applied to the specimen in the direction in which the sloping guide faces converge.

For retaining the jaw members 4 within the yoke 2, shackle 1 is provided with a back plate 11 and a front plate 12 that are held in position, as shown in Fig. 5, by mortised joints and suitable machine screws 13. As shown in Fig. 2, the plates 11 and 12 provide bearing surfaces for the back and front sides, respectively, of the sliding wedges 4 in such manner that the wedges are constrained to move in a vertical plane of the yoke 2, and that they can not become tilted relative to each other. To keep the external faces 5 of the wedges 4 in contact with the sloping faces 3 of the yoke 2 in such manner that the gripping faces 6 will remain parallel, the back plate 11 is provided with guide slots 14 that are disposed parallel to the guide faces 3 and engage operating pins 15 secured in the wedge blocks 4.

In addition to constraining the wedge blocks 4 to one degree of freedom along angularly disposed lines, it is desirable that they be constrained to move simultaneously in order that the gripping opening 7 will remain in the center of the yoke 2 and so that the lower edges of the wedges 4 will be in the same transverse plane. This is accomplished by means of a guide plate or guide block 16 slidingly mounted on the back plate 11 and provided with transverse slots 17 for engaging the guide pins 15 on the wedges 4. The guide block 16 is provided with a centrally disposed tongue or key 18 that engages a longitudinally disposed groove or keyway 19 in the back plate 11. It is apparent that when the guide plate 16 is moved along the keyway 19 the transverse slots 17 will bear upon the pins 15 in such manner that they will be moved simultaneously along the guide slots 14 and cause the jaw members 4 to separate or move towards each other, as the case may be.

For conveniently operating the guide block 16, an operating arm or shifting lever 22 is pivotally mounted at one side of the yoke 2, and is provided at one end with a slot 23 in engagement with a pin 24 that extends rearwardly from the center of the guide block 16. The lever 22 is carried on a shaft 25 extending through and journalled in the yoke 2. At the front side of the shackle 1 the shaft 25 is provided with an operating handle or key 26 engaged by a helical spring 27 which tends to turn the handle in a direction to force the jaw members 4 downwardly to cause them to grip a specimen.

That the jaw members 4 may be held in the open position when a specimen is being inserted or removed, a toggle mechanism is provided to overcome the force exerted by the spring 27. As best shown in Fig. 3, the toggle mechanism comprises a spring 31 secured at one end to a spring pin 32 on the yoke 2 and at the other end to a similar spring pin 33 on an extension of the operating arm 22. When in the position shown in Fig. 3 the spring 31 exerts a force which assists the spring 27 in holding the jaw members 4 in engagement with a specimen. However, it will be readily seen that when the jaws 4 are raised to their uppermost or open position by turning the handle 26, the line of action of the spring 31 (which passes through the centers of the spring pins 32 and 33) will lie below the center of rotation of the shaft 25, and thus the spring 31 will exert a torque which opposes that of the spring 27. The relative strengths of the springs 31 and 27 are such that the opposing force of the spring 31 is sufficient to hold the jaw members in their open position.

As shown in the enlarged sectional view in Fig. 6, the jaw members 4 are provided with teeth or serrations 35 which assist in holding the specimens. However, inasmuch as the teeth 35 cut into the surface of the specimen and thus weaken it, it is ordinarily necessary to make the ends of the specimen larger than the portion disposed between the jaw members in order to avoid breakage within the jaws if the specimen is tested to destruction. However, this expedient is not convenient in that it requires specially prepared test specimens and precludes the possibility of making tests on standard articles such as wires or bars. To overcome the difficulty experienced with the ordinary jaws having teeth which damage the specimen, the jaw members used in the shackle herein described have the points of the teeth cut away along a sloping line, for a distance of about one-quarter of an inch from the ends of the jaws, in such manner that the ends of the jaw members will grip the specimen without deforming it. This form of jaw member has the advantage of distributing the stress transmitted from the wedges to the specimens over a greater longitudinal distance than where the teeth are left with uniform depth throughout the length of the jaw members.

The particular jaw members 4 shown in the drawings are adapted to receive therein a square specimen or a round or approximately round specimen of comparatively small diameter. In the event that it is desired to test specimens of other shapes or sizes, as for instance a flat strip of material, another set of jaw members having suitable gripping faces may be substituted for the jaw members 4 herein shown. To provide for conveniently changing jaw members, the front plate 12 of the shackle 1 is formed with a centrally disposed opening 36, as shown in Figs. 1 and 2, of the proper shape and size to permit a pair of jaw members to be inserted in or withdrawn from the shackle 1. To remove the jaw members through the opening 36, it is necessary that they be moved upwardly to their extreme open position and then brought together in the center of the shackle, whereupon they may be lifted out through the opening 36. For permitting the jaw members 4 to be brought together in the upper part of the yoke 2, the back plate 11 is provided with two short transverse slots 37 which extend inwardly towards each other from the tops of the guide slots 14 and form passageways for the operating pins 15, whereby the jaw members 4 may be moved out of engagement with the guide surfaces 3 and their gripping faces 6 brought together in the upper central portion of the shackle for removal through the opening. To insert another pair of jaw members it is simply necessary to place their gripping faces together and drop them into the opening 36 in such position that their operating pins 15 will enter the inner ends of the transverse slots 37. The jaw members may then be separated and moved to their operating positions with the pins 15 in engagement with the guide slots 14.

After the jaw members have been inserted in the shackle it is desirable that they be retained therein without danger of being accidentally displaced when the shackle is moved about and turned in various positions, or during the operation of testing. For this purpose, means are provided for preventing the operating pins 15 from entering the transverse slots 37 in the back plate 11, excepting when it is desired to change jaw members. This is readily accomplished by providing a stop member which prevents the guide plate 16 from moving upwardly to the position in which the pins 15 may enter the slots 37. As shown in Figs. 2 and 3, the stop member or retaining device comprises a stop pin 38 disposed in the upper end of the keyway 19 in which the tongue 18 of the guide plate 16 operates. It will be readily seen that, when the stop pin 38 is in the position shown, the guide plate 16 will engage it and be stopped at such position that the operating pins 15 will not be permitted to enter the transverse slots 37. As shown, the stop pin 38 is carried on the end of an arm 39 in order that it may be moved out of the way when it is desired to move the guide plate 16 to the top of the keyway 19 for withdrawing the jaw members. The arm 39 is secured to the end of an operating pin 41 that extends through and is journalled in the yoke 2. The pin 41 is provided at its forward end with a suitable operating knob 42, and a helical spring 43 is disposed around the pin 41 within the yoke 2 for exerting an outward force on the knob 42 to hold the stop pin 38 in the keyway 19.

When it is desired to change jaw members it is simply necessary to press inwardly on the knob 42, thereby compressing the spring 43 and lifting the pin 38 out of the keyway 19. The pin 38 may be moved out of the way by turning the knob 42. The guide plate 16 may then be moved to the top of the keyway 19 by means of the handle 26, and the jaw members 4 moved into line with the opening 36 and taken out, as hereinbefore explained.

In Fig. 7 there is shown a portion of a standard testing machine in which a pair of shackles embodying my invention are shown mounted in their operating positions. The testing machine comprises, in general, an upright framework or standard 45 provided at its upper end with a fixed cross head or table 46. A movable table 47, similar to the fixed table 46, is slidingly mounted in the standard 45 and is provided with operating screws 48 disposed to exert force upon the table 47 in a well known manner. Each of the tables 46 and 47 is provided with a head block 49 disposed in a central opening in the table and provided with a spherical seat 50.

In engagement with the spherical seats 50 are complementary spherical heads 51 of hollow tension bolts or supporting rods 52 that carry at their other ends the pair of shackles 1 and 53, respectively. The lower shackle 53 is the same as the upper shackle 1 with the exception that the operating handle 26 is placed in a different position relative to the remainder of the shackle in order that the handles of the two shackles may be on the same side of the testing machine, as shown. The lower supporting rod 52 is provided with a collar 54 that engages a supporting washer 55 on the movable table 47 to prevent the rod from sliding downwardly through the opening in the table 47 when no specimen is engaged by the shackles 1 and 53.

It may be readily seen, upon referring to the representation of the testing machine in Fig. 7, that the shackles which embody my invention greatly expedite the operation of the testing machine. For example, to insert a specimen it is simply necessary to turn both of the operating keys 26 on the shackles 1 and 53 to the position in which the jaw members 4 are held open by the toggle mechanisms. The keys 26 may then be released and the operator's attention devoted to placing the specimen within the gripping openings of the shackles. This may be readily accomplished by raising the upper shackle 1, together with its tension bolt 52, a sufficient distance to permit swinging the shackle 1 out of alignment with shackle 53 and inserting the upper end of the specimen 56 within the jaw 4. Thereafter the key 26 on shackle 1 is turned to close the jaw members 4 which will be forced into initial engagement with the specimen by the springs 27 and 31, as hereinbefore explained. The specimen now being gripped by the shackle 1 and hanging in a substantially vertical position, the lower shackle 53 is brought into specimen-gripping position by means of the movable table 47 and the jaw members closed on the specimen, as above described in connection with shackle 1. After the specimen 56 has been broken, the keys 26 may be again turned to open the jaw members 4, and, in the event that the broken portions of the specimen stick to the jaws, the operator may utilize both hands to remove them, inasmuch as he is not required to hold the jaw members in the open position.

In the event that it is desired to test portions of specimens of indeterminate lengths, they may be inserted into the testing machine through the hollow supporting rods 52 that are disposed with their central openings in alignment with the specimen-receiving openings 7 in the shackles 1 and 53. Also, bent or curved specimens of material, such as wire which has been taken from a reel or coil, may be conveniently inserted by means of the hollow supporting rods. In handling such material the movable table 47 is first moved upwardly to bring the jaw members of the shackles 1 and 53 into engagement. The jaw members are then opened and the wire or other curved specimen passed downwardly through the upper hollow supporting rod 52 and threaded through both of the shackles 1 and 53 into the lower hollow supporting rod. The shackles 1 and 53 may then be separated the desired amount by lowering the table 47, after which the jaw members 4 may be closed upon the specimen and the test made.

From the foregoing description and explanation of my invention, it is apparent that I have provided a shackle mechanism for testing machines that is convenient to operate and adjust, and that is disposed to hold specimens of various lengths and shapes.

Although I have shown and described only one embodiment of my invention, it will be obvious to others, particularly those skilled in the art of testing materials, that various modifications may be made in the details of the shackle mechanism herein shown without departing from the spirit and scope of the invention, as defined in the appended claims.

I claim:

1. A shackle for testing machines comprising a frame having converging guide surfaces, gripping jaw members having bearing surfaces in engagement with the guide surfaces and having gripping surfaces disposed substantially parallel to each other, operating pins extending from the jaw members, a guide block slidably mounted on the frame and having transverse slots for engaging the pins on the jaw members to guide them, a pivoted arm for moving the guide block and jaw members, and a spring connected to the arm for forcing the jaw members to their closed position.

2. A shackle for testing machines comprising a frame having converging guide surfaces, gripping jaw members having bearing surfaces in engagement with the guide surfaces and having gripping surfaces disposed substantially parallel to each other, operating pins extending from the jaw members, a guide block slidably mounted on the frame and having transverse slots for engaging the pins on the jaw members to guide them, a pivoted arm for moving the guide block and jaw members, and a spring connected to the arm for forcing the jaw members to their closed position, said pivoted arm and spring constituting a toggle adapted to hold the jaw members in their open position.

3. In a shackle for testing machines, a yoke having internal sloping faces, jaw members within the yoke having complementary faces in engagement therewith, a back plate on the yoke having guide slots formed therein, there being pins on said jaw member slidable within said guide slots to maintain said jaw members in contact with said faces, there being transverse slots in communication with said first mentioned slots for permitting the jaws to be moved away from the yoke faces at their extreme open position.

4. In a shackle for testing machines, a yoke having internal sloping faces, jaw members within the yoke having complementary faces in engagement therewith, a back plate on the yoke having guide slots formed therein, pins on said jaw members slidable in said guide slots whereby said jaw members are held in contact with said faces, there being transverse slots in said back plate in communication with said first mentioned slots for permitting the jaw members to be moved away from the yoke faces at their extreme open position, and a face plate on the yoke for retaining the jaw members, said face plate having a central opening disposed to permit removal of the jaw members when they are removed from their extreme open position and their pins are in said transverse slots.

5. In a shackle for testing machines, a yoke having internal sloping faces, jaw members within the yoke having complementary faces in engagement therewith, a back plate on the yoke having guide slots formed therein, pins on said jaw members slidably mounted in said guide slots whereby said jaw members are held in contact with said faces, there being transverse slots in said back plate for permitting the jaw members to be moved from the yoke faces at their extreme open position, a face plate on the yoke, said face plate having a central opening disposed to permit removal of the jaw members when they are moved from their extreme open position along the transverse slots in the back plate, a latching means for preventing the jaw members from being moved along the transverse slots.

6. In a shackle for a testing machine, the combination with a yoke having internal sloping contact faces, and jaw members having complementary external sloping faces disposed in engagement with the faces in the yoke, of a back plate on the yoke having slots parallel to the contact faces, pins extending through the slots and into the jaw members for guiding them, and a guide block slidably mounted on the back plate and having transverse slots engaging the pins on the jaw members to move them simultaneously.

7. In a shackle for a testing machine, the combination with a yoke having internal sloping contact faces and jaw members having complementary external sloping faces disposed in engagement with the faces in the yoke, of a back plate on the yoke having slots parallel to the contact faces, pins extending through the slots and into the jaw members for guiding them, a guide block slidably mounted on the back plate and having transverse slots engaging the pins on the jaws to move them simultaneously, an operating lever pivoted on the yoke and connected to the guide block for moving it, and a spring connected to the operating lever for forcing the jaw members to their closed position, said lever and spring constituting a toggle mechanism adapted to hold the jaw members in their extreme open position for inserting specimens.

8. In a shackle for a testing machine, a yoke having internal sloping faces, jaw members within the yoke having complementary faces in engagement therewith, guide pins in the jaw members, a back plate on the yoke having guide slots disposed parallel to the faces for receiving the pins on the jaw members to hold them in contact with the faces, said back plate having transverse slots for permitting the jaw members to be moved from their extreme open position towards each other and away from the yoke faces, a face plate on the yoke for retaining the jaw members and having a central opening to permit removal of the jaw members when they are moved together along the transverse slots in the back plate, a guide block slidably mounted on the back plate and having transverse slots for engaging the pins on the jaw members to move them simultaneously, a stop member for the guide block disposed to prevent the jaw members from being moved to the position in which the guide pins will enter the transverse slots in the back plate, and means for moving the stop member to permit removal of the jaw members from the yoke.

9. In a shackle for a testing machine, a yoke having internal sloping faces, jaw members within the yoke having complementary faces in engagement therewith, guide pins in the jaw members, a back plate on the yoke having guide slots disposed parallel to the faces for receiving the pins on the jaw members to hold them in contact with the faces, said back plate having transverse slots for permitting the jaw members to be moved from their extreme open position towards each other and away from the yoke faces, a face plate on the yoke for retaining the jaw members and having a central opening to permit removal of the jaw members when they are moved together along the transverse slots in the back plate, a guide block slidably mounted on the back plate and having transverse slots for engaging the pins on the jaw members to move them simultaneously, a stop member for the guide block disposed to prevent the jaw members from being moved to the position in which the guide pins will enter the transverse slots in the back plate, means for moving the stop member to permit removal of the jaw members from the yoke, an arm pivoted on the yoke and engaging the guide block for moving it, and a spring connected to the arm to constitute a toggle mechanism adapted to force the jaw members to their closed position and to hold the guide block against the stop member for retaining the jaw members in their open position to permit insertion of specimens.

10. In a shackle for testing machines, a yoke having internal sloping faces, jaw members loosely disposed within said yoke and having complementary faces in engagement therewith, means for guiding the jaw members within the yoke parallel to the faces thereof to open or close them, means for moving the jaws simultaneously, and an element movable into and out of the path of movement of said last-mentioned means to prevent and permit removal of the jaw members from within said yoke.

11. In a shackle for a testing machine, the combination of a yoke having internal sloping contact faces disposed at an angle to one another, jaw members having external sloping contact faces that correspond to and contact with the faces in said yoke, means for moving said jaw members simultaneously to open or close them, and resilient means including a toggle mechanism adapted to cooperate with said first-mentioned means to hold the jaw members in open position and also force said jaw members into closed position.

12. In a shackle for a testing machine, a jaw-holder frame having converging guide portions, jaw members slidably mounted in the guide portions, a guide block carried by the frame for moving the jaw members simultaneously and means including a toggle mechanism acting through said block for holding the jaw members in open position, said means also being adapted to force the jaw members into closed position.

13. In a shackle for a testing machine, a yoke having internal sloping faces, jaw members within the yoke having complementary faces in engagement therewith, means for guiding the jaw members within the yoke parallel to the faces thereof to open and close them, means for moving the jaw members simultaneously, and resilient means including a toggle mechanism acting through said moving means for holding the jaw members in open position, said resilient means also being adapted to force the jaw members into closed position.

In testimony whereof, I sign my name.
RICHARD L. TEMPLIN.